Patented June 21, 1938

2,121,039

UNITED STATES PATENT OFFICE 2,121,039

INSECTICIDAL COMPOSITIONS COMPRISING DINITRO-CRESOLS

Lindley E. Mills, Midland, Mich., assignor to The Dow Chemical Company, Midland, Mich., a corporation of Michigan No Drawing. Application April 1, 1936,
Serial No. 72,143

6 Claims. (Cl. 167—43)

This invention relates to insecticidal compositions comprising a petroleum distillate; and, more particularly, to an improved insecticidal agent comprising a petroleum distillate and a relatively small amount of a dinitro-cresol, i. e., dinitro-ortho-cresol, dinitro-meta-cresol, dinitro-para-cresol.

Among the objects of my invention is the provision of an insecticidal composition which is (1) non-injurious to growing plants when applied thereto at the concentrations necessary for the control of insects thereon; (2) more toxic to insect life than are the known insecticidal compositions comprising oil as the effective agent, so that they may be applied to plants at concentrations of toxic material much lower than those ordinarily recommended; (3) capable of controlling pest infestation at sufficiently low concentrations to allow the inclusion of crude and comparatively inexpensive petroleum distillates containing up to as much as 50 per cent by weight of unsaturated hydrocarbons therein without injury to plants treated therewith; and, (4) substantially non-toxic to domestic animals and human beings.

The effectiveness of petroleum oils as a toxic agent in insecticidal materials has long been recognized. They have, however, been subject to certain disadvantages in actual use, the chief of which is their well known tendency to injure foliage and to depress the metabolism of plants when applied thereto in the concentrations required to kill insects, their eggs, and larvae. Inasmuch as the plant-injuring tendency of petroleum oils has been believed to be directly proportional to their unsaturated hydrocarbon content, it has been common in practice to limit the choice of oils for insecticidal use to those substantially free from such unsaturated ingredients. Refined non-volatile petroleum fractions, which have been recommended as safe for use, are stated to be those containing not more than 15 per cent of unsaturated hydrocarbons, as determined by the sulphonation test described in Bureau of Mines Technical Paper 181.

Although these oils are stated to be non-toxic, chemically inert and non-injurious to plants, extensive research has not substantiated these claims, and it has been found that non-volatile oils, regardless of their purity, actually do produce serious physiological disturbances in healthy plants when used in sufficient strength to control insect pests, apparently because the non-volatile oil, adhering upon the leaf, interferes with transpiration, and also is absorbed more or less into the active circulation of the plant, causing metabolic disturbances. Attempts have been made to prevent plant injury by regulating oil viscosities, gravities, volatilities, concentrations, and the degree of refinement, but all of these attempts have failed to eliminate the danger of plant injury. Volatile oils, such as kerosene, when used in spray emulsions, are not effective in small concentrations because they vaporize too rapidly, while if used in larger concentrations they cause leaf burn and other plant injuries. For a time it was thought that highly purified viscous oils, such as white oils, could be used with safety on foliage, but it was found that much of the deleterious action of oil on foliage was physical rather than chemical and that the per cent of unsulphonatable residue in the oil was not a reliable measure of its safety for use as an insecticide.

Oil-in-water emulsions have been used as dormant sprays for San Jose scale, red mite, and leaf hopper. For use against aphids, however, concentrations up to 6 and 8 per cent of oil in the applied emulsions have failed to give any effective control and at such concentrations twig kill, bud kill, and general retardation of the tree development has been widely reported.

Summer application of oil emulsions for codling moth control has been found to cause reduction in size, faulty coloring, and premature drop of fruit, as well as defoliation of the growing tree. The relatively high concentrations of such emulsions required to effect a satisfactory insect control are detrimental to the quality and quantity of the harvested fruit and injurious to the tree.

Insecticidal oils have been combined with anti-penetrating agents and miscible organic derivatives calculated to reduce the absorption of oil by the leaf, and to vary the rate of evaporation of the oil film. Such remedial procedures increase the ultimate cost of pest control without appreciably increasing the effectiveness of the insecticidal composition or reducing its injuriousness to plants.

The dinitro-cresols are known to have insecticidal properties, but when applied to plants as dusts or aqueous suspensions, or in the form of their water-soluble salts in the amounts necessary for satisfactory insect control, they also cause severe injury with defoliation, retardation of normal development, and metabolic disturbances.

Although dinitro-cresols and petroleum oils each damage plants to such an extent that they cannot individually be applied as a general insecticidal spray in dosage sufficient to control insects without damage of serious injury to the plant itself, I have discovered that, by dissolving dinitro-cresols in petroleum distillates, there are obtained compositions possessing insecticidal properties which are far greater than the additive insecticidal properties of their components; and that these compositions may be applied safely to plants in amounts sufficient for effective insect control without danger of injury to the plant. I have further found that the reduced amounts of such compositions required to control insects efficiently permit the employment of partially refined petroleum distillates containing up to 50 per cent by weight of sulphonatable constituents as a component in such compositions without injuring the trees or plants to which the insecticide may be applied. My invention, accordingly, provides insecticidal compositions wherein cruder and less expensive distillates may be employed than have previously been considered suitable for inclusion in plant insecticides of the oil emulsion type.

My new products are generally prepared by dissolving or otherwise dispersing a dinitro-cresol, e. g. 2.4-dinitro-6-methyl-phenol, 2.5-dinitro-6-methyl-phenol, 2.4-dinitro-5-methyl-phenol, 2.6-dinitro-5-methyl-phenol, 2.6-dinitro-4-methyl-phenol, 2.5-dinitro-4-methyl-phenol, etc., or mixtures of such compounds in a petroleum distillate. I generally prefer to make a solution or suspension containing between about 0.075 and 10 per cent by weight of the dinitro-cresol in the distillate, but any suitable concentrations of this material in petroleum distillate are included within the scope of my invention.

I find that such an insecticidal composition may be applied to plants in a variety of ways and for a variety of purposes. I may apply such distillate-toxic solution directly to an insect-infested tree or plant, as a mist or fog, or it may be diluted with water and applied in spray form as an oil-water emulsion, in which case spreading and emulsifying agents such as casein, metallic caseinates, blood albumin, naphthenates, etc., are preferably incorporated therewith. My new solutions may be applied to plants or trees in any strength not causing plant injury and burning, but I generally prefer to apply them in the form of an oil-in-water suspension containing between about 0.10 and about 5.0 per cent by weight of the distillate-dinitro-cresol mixture. The optimum concentration of effective agent in the suspension varies with both the concentration of dinitro-cresol in the oil and the particular purpose for which the agent is being applied.

My new insecticidal compositions may be used as either dormant or summer sprays, change being made in the type of distillate used, and in the concentration of the toxic principle employed therein, as required. Inasmuch as these new materials function as both contact and stomach poisons, they may be applied as ovicides, aphicides, larvicides, or scalicides with equally effective results.

I have found in using the herein described mixture of petroleum distillates and dinitro-cresols that the function of each component is complementary to that of the other, which fact undoubtedly explains the greater than additive results which have been obtained. This unpredictable increase in toxicity, by enabling the control of pest infestation with smaller amounts of my new insecticidal mixtures, avoids the high concentrations of distillate and/or other toxic principle on the leaves, blossoms, fruit, or bark which have previously caused plant injury. It is this great reduction in the concentration of insecticidal material deposited on the tree or plant which enables me safely to utilize less refined oils and oils of higher unsaturated hydrocarbon content than were previously thought practical for such use.

The relatively non-poisonous character of these new compositions as compared to sprays containing derivatives of lead, arsenic, mercury, cyanide, etc., constitutes a decided advantage in the use of the same. The comparatively non-poisonous character of the dinitro-cresols, the low concentrations of the dinitro-cresols generally included in the oil, and the low concentration of the oil emulsions required for insect control substantially eliminate occupational hazards in spraying. Washing and scrubbing of sprayed fruit before marketing, as is at present generally required, is in most cases obviated. Such minute traces of oily spray residue as may be left on the fruit at time of marketing are substantially non-toxic to humans.

The following table shows the approximate limits within which I have found that the percentages by weight of materials may be varied as they appear in the finished emulsion ready for application to plants:—

|  | Percent by weight |
|---|---|
| A petroleum distillate containing at least 50 per cent by weight of unsulphonatable residue | 0.10 – 5.0 |
| A dinitro-cresol | 0.001– 0.2 |
| An emulsifying agent | 0.005– 0.8 |
| Water | 99.894– 94.0 |
|  | 100.000 100.0 |

The following examples show in detail a number of ways of preparing my oily insecticides and testing the same, and illustrate the results obtained thereby, but are not to be construed as limiting my invention.

*Example 1*

3 pounds of 2.4-dinitro-6-methyl-phenol, i. e. dinitro-ortho-cresol, were dissolved in 72 pounds of a lubricating oil having an unsulphonatable residue of 82 per cent, a Saybolt viscosity of 99–100 seconds, and a boiling range of 606°–742° F. This solution was emulsified with 2 pounds of sodium caseinate, previously dissolved in 23 pounds of water, to prepare a mixture which will hereafter be referred to as the stock emulsion. This stock emulsion was diluted with varying amounts of water and applied to apple and cherry trees as a dormant spray.

A dilute suspension comprising 0.83 per cent of the stock emulsion, and containing therefore 0.60 per cent of the petroleum distillate and 0.025 per cent of the dinitro-ortho-cresol, gave a 94 per cent control of rosy apple aphis infestation on apple trees of the Chenango variety. A suspension comprising 1.66 per cent of the stock emulsion, i. e., 1.20 per cent petroleum distillate and 0.050 per cent dinitro-ortho-cresol, was 99 per cent effective in controlling rosy apple aphis on badly infested apple trees of the Greening variety. Concentrations of 0.83 and 1.66 per cent of the stock emulsion in water gave 86 and 100 per cent control, respectively, of cherry aphis when applied to cherry trees of the Schmidt's Bigarreau variety.

The percentage aphid control, as given above, was determined by comparison of the number of aphid-infested growing points observed on treated and control trees after their complete foliation, and was calculated according to the Abbot formula, i. e., $$\text{the percentage control} = \frac{X-Y}{X} 100$$

when X represents the average number of infested growing points on the check on control trees, and Y represents the average number of infested growing points on the treated trees. The expression "growing point" may be defined as any lateral or terminal shoot or spur, with or without fruit.

Periodical examination of the sprayed plots throughout the growing season showed no injury attributable to the spray application. Examination of ripened fruit from trees sprayed with my diluted stock emulsion showed substantially no aphid injury, while fruit from unsprayed control trees was seriously damaged.

An emulsion was prepared as above, containing only the previously described lubricating oil. Practically no aphid control was accomplished by use of this material at the same dilutions as found satisfactory with the stock emulsion. At concentrations high enough to accomplish control, severe bud and twig injury was observed. These results were manifestly unsatisfactory as compared to those obtained with the diluted emulsion containing dinitro-ortho-cresol as well as the oil.

Due to the non-adhering nature and water-insolubility of the dinitro-ortho-cresol, it was found impractical to conduct field tests with this material alone. Laboratory results, however, indicated that the high concentration of this compound required to effect a satisfactory pest control would be expected to give excessive bud and blossom injury.

Example 2

5.0 pounds of 2.4-dinitro-6-methyl-phenol, i. e., dinitro-ortho-cresol, were dissolved in 70 pounds of the lubricating oil described in Example 1. This solution was emulsified with 2 pounds of sodium caseinate and 23 pounds of water to form a relatively stable emulsion. This preparation, henceforth termed "emulsion B", and the stock emulsion of Example 1, which for convenience will be designated as "emulsion A", were diluted with varying amounts of water and applied experimentally to apple trees for the control of San Jose scale.

The following table shows the degree to which the various concentrations of emulsion were effective in controlling scale infestation:—

|  | Per cent by weight of emulsion in spray as applied | Per cent by weight of oil in spray as applied | Per cent by weight of dinitro-ortho-cresol in spray as applied | Percentage kill of scale |
|---|---|---|---|---|
| Emulsion A | 0.83 | 0.60 | 0.025 | 80.3 |
| Do | 1.66 | 1.20 | 0.050 | 99.0 |
| Emulsion B | 0.50 | 0.35 | 0.025 | 83.7 |
| Do | 1.0 | 0.70 | 0.05 | 95.0 |
| Do | 2.0 | 1.40 | 0.10 | 100.0 |

Percentage kill was determined by careful examination of representative samples of the bark of the sprayed trees. The covering of each individual scale was lifted by means of a dissecting needle and the condition of the enclosed insect ascertained by study of the same under a binocular microscope of moderate power.

No injury to buds and blossoms or twig kill resulted from the use of my new insecticidal compositions in the concentrations tested and the incidental aphid control was practically complete.

An insecticidal composition comprising the oil alone required an oil concentration of 3 per cent in the spray as applied to give a satisfactory control of scale and had little or no effect on aphid infestation.

Example 3

The aphicidal values of oil solutions comprising the isomeric dinitro-cresols were determined in the laboratory.

The insects used in aphicide experimentation were adults of the species Aphis rumicus L. In each determination, tests were made on four groups of 25 or more aphids each. When, for purposes of comparison, it was desired to obtain a toxicity value for a dinitro-cresol alone, the said cresol derivative was applied to the aphids in solution or suspension in water or a water-soap solution. Solutions of dinitro-cresols in petroleum distillates and petroleum distillates alone were emulsified with a solution of sodium caseinate in water before application to the aphids.

Each aphid test group was placed on a disk of cotton flannel in a Petri dish and sprayed with 0.5 milliliter of the previously prepared test solution or emulsion. After spraying, the aphids were transferred from the flannel to a melon leaf, nasturtium foliage, or other growing vegetation, previously mounted in a wide-mouthed bottle containing a small amount of water, and allowed to stand for 24 hours. The number of dead and living aphids in each test group was then determined by microscopic inspection, the results averaged, and the percentage control calculated therefrom.

2.4-dinitro-6-methylphenol, i. e. dinitro-ortho-cresol, was tested as above described and found to kill only 4.0 per cent of the aphids at a concentration of 0.05 per cent by weight of toxic in water.

0.25 gram of dinitro-ortho-cresol was then dissolved in 100 grams of a semi-refined petroleum oil having an unsulphonatable residue of 77 per cent, a Saybolt viscosity of 76°, and a boiling range of 560°–760° F., and the resulting solution in emulsified form was found to kill 95.3 per cent of the test aphids when diluted to a concentration of 0.5 per cent of the oil and 0.00125 per cent of the cresolic derivative in the applied solution.

The semi-refined oil when tested at a concentration of 0.5 per cent gave only 36.5 per cent control of the aphids.

From the above results it was found that a combination of oil and dinitro-ortho-cresol was approximately 2.36 times as toxic to aphids as would have been expected from the sum of the individual toxicities of the oil and the dinitro-cresol.

In a similar manner the aphicidal toxicities were determined for 2.4-dinitro-5-methyl-phenol, i. e., dinitro-meta-cresol, and 2.6-dinitro-4-methyl-phenol, i. e., dinitro-para-cresol. 0.05 per cent of dinitro-meta-cresol in water gave 6.0 per cent control. An emulsion containing 0.5 per cent of the oil and 0.00125 per cent of the dinitro-cresol killed 83.0 per cent of the aphids. The combination of oil and dinitro-derivative was, therefore, 1.96 times as toxic as might have been expected.

Dinitro-para-cresol at a concentration of 0.05 per cent in water killed 6.2 per cent of the aphids while a concentration of 0.00125 per cent in oil and water emulsion was effective against 71.8 of the test insects. This oil-toxic combination was, therefore, approximately 1.68 times as effective as the sum of its constituents.

Example 4

Tests were carried out on 2.4-dinitro-6-methyl-phenol, i. e. dinitro-ortho-cresol and 2.6-dinitro-4-methyl-phenol, i. e. dinitro-para-cresol, dissolved in petroleum distillate to determine the efficiency of such solutions as larvicides. Small Jonathan apples of uniform size and of a good grade were used in making the tests. Newly hatched codling moth larvae were obtained by the method of Farrar and Flint (Farrar and Flint, "Rearing Codling Moth Larvae throughout the Year"—Jr. Econ. Ent. 23:41–44, 1930). The dinitro-cresol to be tested was dissolved in the desired petroleum distillate and the resultant solution was then emulsified with sodium caseinate and water. The Jonathan apples were thoroughly washed and the stem and calyx cavities were sealed with paraffin to prevent the entrance of larvae through these vulnerable zones. Each apple was sprayed by means of an atomizer with 10 cubic centimeters of the previously diluted test emulsions, after which it was stored under laboratory conditions for 24 hours before being infested with 10 newly hatched codling moth larvae. Control tests were made in which the apples were sprayed with emulsified petroleum distillate alone before infestation.

Immediately upon transference of the larvae to the apples, the latter were placed in a constant temperature container at 28.5° C. and 70 per cent relative humidity for two days. The apples were then removed from the container and stored under laboratory conditions for five days, after which the number of stings and entries in each apple was recorded. An attack by the larvae upon the surface of the apple was considered a sting if the larva had penetrated less than one-quarter of an inch into the apple and was not found to be living. The injury was considered an entry if the live larva was found or the hole was more than a quarter of an inch in depth.

The petroleum oil used in the preparation of the distillate-toxic test solutions was a lubricating oil type having an unsulphonatable residue of 77 per cent, a Saybolt viscosity of 76°, and a boiling range of 560°–760° F.

0.1 gram of dinitro-ortho-cresol was dissolved in 100 grams of the above described lubricating oil, and the resulting solution emulsified with sodium caseinate and sufficient water to give a 1.25 per cent solution of oil in the final mixture. This emulsion was tested as described in the above paragraphs. The apples so treated were found to average a total of 2.4 entries and stings per apple after the prescribed period of incubation. A spray composition comprising 1.25 per cent of the lubricating oil alone, when applied to apples according to the described procedure, was found to allow an average of 3.24 entries and stings on each apple treated. It is evident, therefore, that compositions comprising the oil in the absence of my dinitro-ortho-cresol compound allow 35 per cent more stings and entries than does my new insecticidal mixture.

Dinitro-para-cresol was tested in a similar manner and found to allow an average of 2.2 stings and entries on each apple tested. A simultaneous check run made with the lubricating oil alone allowed 32 per cent more stings and entries, i. e. an average of 2.9 for each apple, than did the distillate-toxic mixture.

It was not possible to obtain accurate data concerning the larvicidal toxicity of the dinitro-cresols alone against codling moth due to their water insolubility and non-sticking, crystalline nature. Application of the dinitro-cresols in admixture with various spreaders and sticking agents indicated that control could be obtained with high concentrations of the same. There was a tendency, however, toward discoloration and injury of the fruit. Such undesirable effect was avoided by use of the petroleum distillate-toxic solutions due to the lower concentrations of toxic principle giving effective control.

Example 5

Petroleum distillates and distillate solutions containing dissolved toxic materials penetrate insect eggs and exert a toxic effect on the developing embryos. In determining the ovicidal values of petroleum distillate solutions of dinitro-ortho- and dinitro-para-cresol, the eggs of *Lygaeus kalmii* Stal. and of the Colorado potato beetle were used for testing. The eggs were collected from the oviposition cages every day and were used in the experiments within 24 hours after removal. The dinitro-cresol to be tested was dissolved in the desired petroleum distillate and emulsified with a solution of sodium caseinate and water. A control emulsion was prepared by omitting the cresolic constituent from the petroleum distillate-caseinate-water emulsion. The petroleum distillate used in this type of determination was a lubricating oil having a Saybolt viscosity of 99–100 seconds, a boiling range of 606° to 742° F., and an unsulphonatable residue of 82 per cent.

In testing with the eggs of *Lygaeus kalmii* Stal., eggs oviposited over a 24 hour period were thoroughly mixed to insure homogeneous sampling and sample lots of 50 were transferred to Petri dishes containing moistened filter paper. The eggs were scattered evenly over the center of the filter paper, particular care being taken to prevent any of the eggs remaining in contact with one another. When testing with the eggs of the Colorado potato beetle, the same general procedure was followed except that no effort was made to break up the naturally occurring egg masses.

Each Petri dish containing eggs was sprayed with 2.5 cubic centimeters of the diluted emulsion, the excess spray liquid drained off, the exposed glass of the dish wiped clean with a towel, and the dish stored in an incubator maintained at a constant temperature of 30° C. and a relative humidity of about 85 per cent. The eggs were allowed to remain under these conditions for a period of six days.

Following the incubation period, examination of the eggs sprayed with the diluted emulsions showed that the embryos had died at various stages in their development. Some of the fully developed embryos managed to break through the egg shell or chorion, but died almost immediately following the hatching phenomenon.

In calculating the average per cent mortalities, the number of larvae that died immediately after hatching and the number of eggs that failed to hatch were added together. For example, of the 300 eggs used in determining the ovicidal effect of the petroleum distillate control emulsion at a concentration of 2 per cent, 81 eggs failed to hatch and 39 eggs hatched but the young larvae died immediately after hatching. The distillate was, therefore, effective on 120 eggs out of 300 to give an average per cent mortality of 40.0.

Net mortalities as compared with control were calculated by the following method:—

Where X equals the percentage of eggs that were not killed in the group treated with the dinitro-cresol-free distillate emulsion, and Y equals the percentage of unaffected eggs in the group treated with distillate plus the dinitro-cresols, $$\left(\frac{X-Y}{X}\right)100$$

equals the net mortality as compared with control as zero.

For example, 1.0 gram of dinitro-ortho-cresol was dissolved in 100 grams of the previously described lubricating oil and a portion of this solution emulsified with sodium caseinate and sufficient water to form a 2 per cent concentration of oil-toxic solution in the final mixture. This was tested as described above and found to kill 94 per cent of the eggs of Lygaeus kalmii Stal. Since the oil alone kills 40 per cent of these eggs, the net mortality as compared to such oil is 90.0. A water solution containing 0.02 per cent dinitro-ortho-cresol gave less than 5 per cent average kill of the same eggs. The oil-dinitro-ortho-cresol combination is, therefore, substantially twice as toxic as might have been anticipated from the toxicities of its components.

2.0 grams of dinitro-ortho-cresol were dissolved in 100 grams of the previously described lubricating oil and a portion of this solution emulsified in the usual manner to form a 2.0 per cent concentration of oil-toxic solution in the final mixture. This was tested against the eggs of the Colorado potato beetle and found to give a percentage kill of 100. Since an emulsion comprising 2 per cent of the oil alone kills only 13.6 per cent of these eggs, the net mortality as compared to such oil is 100. A water solution containing 0.04 per cent of dinitro-ortho-cresol gave less than 10 per cent average kill of treated eggs. The oil-dinitro-ortho-cresol combination is, therefore, more than 4 times as toxic as might have been anticipated from the toxicities of its components.

Example 6

Laboratory tests were carried out to determine the effectiveness of petroleum distillate solutions of 2.4-dinitro-6-methyl-phenol, i. e. dinitro-ortho-cresol as scalicides against Aspidiotus perniciousus Comstock, commonly termed San Jose scale. The general procedure followed was as follows:—

Branches about one-half inch in diameter and well infested with San Jose scale were pruned of all sucker branches, twigs, etc., and cut into two inch segments, care being taken that an approximately equal number of scales were evenly distributed over the surface of each segment. The piece to be tested was impaled on the end of a dissecting needle and sprayed with 2.5 cubic centimeters of a diluted test emulsion at 10 pounds pressure. During the spraying procedure the needle was revolved continuously in order to insure complete coverage of the scale. The stick was then removed from the needle and incubated along with controls in a constant temperature and humidity chamber for a period of 72 hours, after which the mortality determinations were made. This was accomplished by the removal of the top of each individual scale and examination of the enclosed insect under a binocular microscope to determine the effect thereon of the spraying treatment.

The materials were prepared by dissolving various amounts of dinitro-ortho-cresol in a petroleum distillate having a specific gravity of 0.8815 at 20°/4° C., a Saybolt viscosity of 99°–100°, a boiling range of 606° to 742° F., and an unsulphonatable residue of 82 per cent. These oil solutions were then emulsified with sodium caseinate and sufficient water to give test mixtures in the form of relatively stable emulsions containing the desired concentrations of oil-toxic solution. Control emulsions were prepared by emulsifying the above described lubricating oil with sodium caseinate and water.

The following table summarizes the results obtained with various spray compositions according to the above procedure:—

| Percent dinitro-ortho-cresol in the oil solution | Percent oil solution in the test spray | Percent oil in test spray | Percent dinitro-ortho-cresol in test spray | Percent mortality |
|---|---|---|---|---|
| 0.5 | 1.0 | 0.995 | 0.005 | 69.66 |
| 1.0 | 1.0 | 0.99 | 0.01 | 82.00 |
| 2.0 | 1.0 | 0.98 | 0.02 | 94.00 |
| 0.0 (control) | 1.0 | 1.0 | 0.00 | 58.00 |
| 0.5 | 2.0 | 1.99 | 0.01 | 97.00 |
| 1.0 | 2.0 | 1.98 | 0.02 | 98.5 |
| 0.0 (control) | 2.0 | 2.0 | 0.00 | 83.0 |

The per cent mortalities listed in the above table represent the average kill of scale organisms on ten experiments for each test solution listed and are not compared to control by any arbitrary formula.

Experiment has shown that dinitro-ortho-cresol applied to scale formations in the form of a dust, in conjunction with various stickers and spreaders, or as a saturated water solution, has little or no effect upon scale organisms. The increase in toxicity shown by oil solutions of the same is, therefore, a surprising and entirely unexpected result.

While sodium caseinate has been specified as the emulsifying agent in each of the above examples other emulsifying agents such as casein, blood albumin, bentonite, naphthenates, glyceryl oleate, cresylic acid, oleic acid, etc., may be substituted therefor, depending upon the type of emulsion desired, e. g. stable, quick breaking, tank mix, cold mix, miscible oil, etc.

I have shown by the preceding examples some of the ways in which my invention may be applied, and have given a résumé of the manner in which these new insecticidal compositions have been tested in determining the efficiency, toxicities, and economic superiority of the same as compared to known insecticidal agents comprising petroleum distillate. The advantages accruing to the use of these new insecticides include (1) their increased toxicity to insect life at low concentrations; (2) the absence of plant injury resulting from their application in concentrations suitable for pest control; (3) the use therein of comparatively inexpensive, partially refined petroleum distillates; (4) their substantial non-toxicity to domestic animals and man; (5) and the low comparative cost of insect control possible through their use.

Other modes of applying the principle of my invention may be employed instead of those explained, change being made as regards the materials or their amounts employed, provided the ingredients stated by any of the following claims or their equivalent be employed.

I therefore particularly point out and distinctly claim as my invention:—

1. An aqueous insecticidal emulsion suitable for application to living plants without causing injury thereto, comprising up to about 5 per cent of an oil having an unsulphonatable residue of at least 50 per cent by weight, and up to about 0.5 per cent of a dinitro-cresol.

2. An aqueous insecticidal emulsion suitable for application to living plants without causing injury thereto, comprising:

|  | Percent by weight |
|---|---|
| A petroleum distillate containing at least 50 percent by weight of unsulphonatable residue | 0.10 – 5.0 |
| A dinitro-cresol | 0.001 – 0.2 |
| An emulsifying agent compatible with the other constituents of the composition and non-reactive with the phenol compound | 0.005 – 0.8 |
| Water | 99.894 – 94.0 |
|  | 100.000  100.0 |

3. An aqueous insecticidal emulsion suitable for application to living plants without causing injury thereto, comprising:

|  | Percent by weight |
|---|---|
| A petroleum distillate containing at least 50 percent by weight of unsulphonatable residue | 0.10 – 5.0 |
| 2.4-dinitro-6-methyl-phenol | 0.001 – 0.2 |
| An emulsifying agent compatible with the other constituents of the composition and non-reactive with the phenol compound | 0.005 – 0.8 |
| Water | 99.894 – 94.0 |
|  | 100.000  100.0 |

4. An insecticidal composition suitable for application to living plants without causing injury thereto comprising a petroleum distillate having an unsulphonatable residue of at least 50 per cent by weight, and up to about 0.5 per cent of 2.6-dinitro-4-methyl-phenol.

5. An insecticidal composition suitable for application to living plants without causing injury thereto comprising a petroleum distillate having an unsulphonatable residue of at least 50 per cent by weight, and up to about 0.5 per cent of 2.4-dinitro-5-methyl-phenol.

6. An insecticidal composition suitable for application to living plants without causing injury thereto comprising a petroleum distillate having an unsulphonatable residue of at least 50 per cent by weight and up to about 0.5 per cent of 2,4-dinitro-6-methyl phenol.

LINDLEY E. MILLS.